J. C. BURROWES.
RAILWAY CAR LIGHTING MECHANISM.
APPLICATION FILED APR. 11, 1916.
1,263,848.
Patented Apr. 23, 1918.
2 SHEETS—SHEET 1
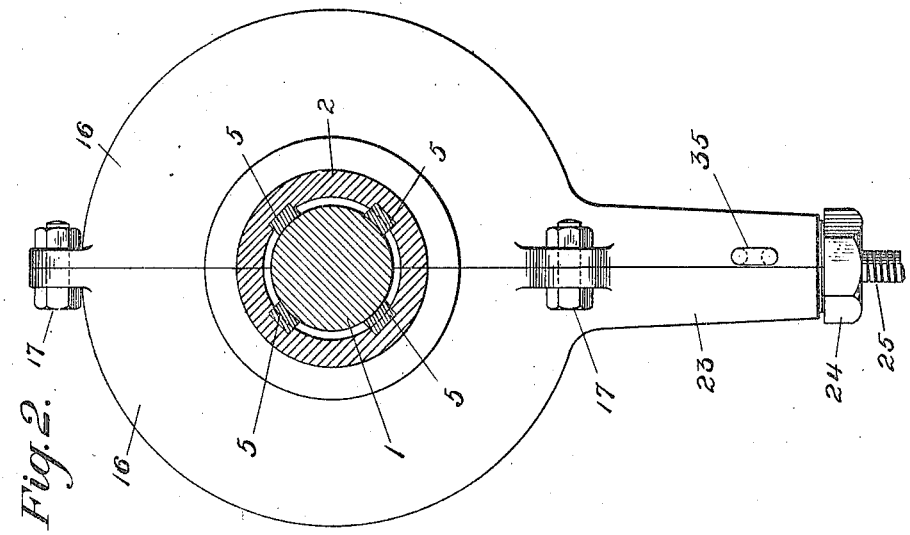
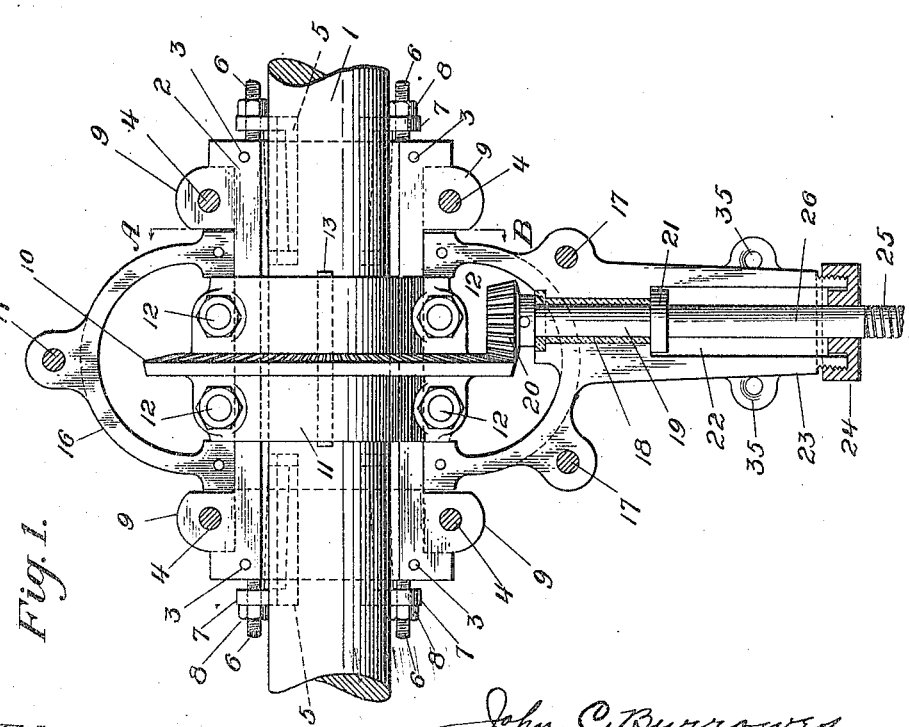

J. C. BURROWES.
RAILWAY CAR LIGHTING MECHANISM.
APPLICATION FILED APR. 11, 1916.
1,263,848.
Patented Apr. 23, 1918.
2 SHEETS—SHEET 2.
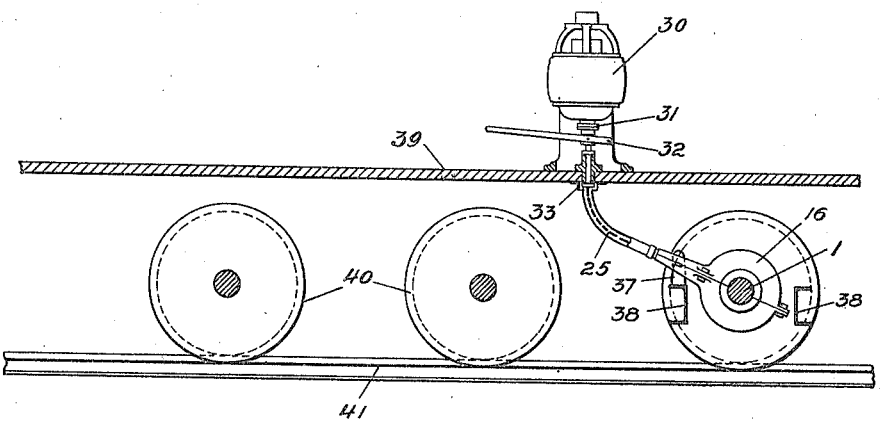
Fig. 3.
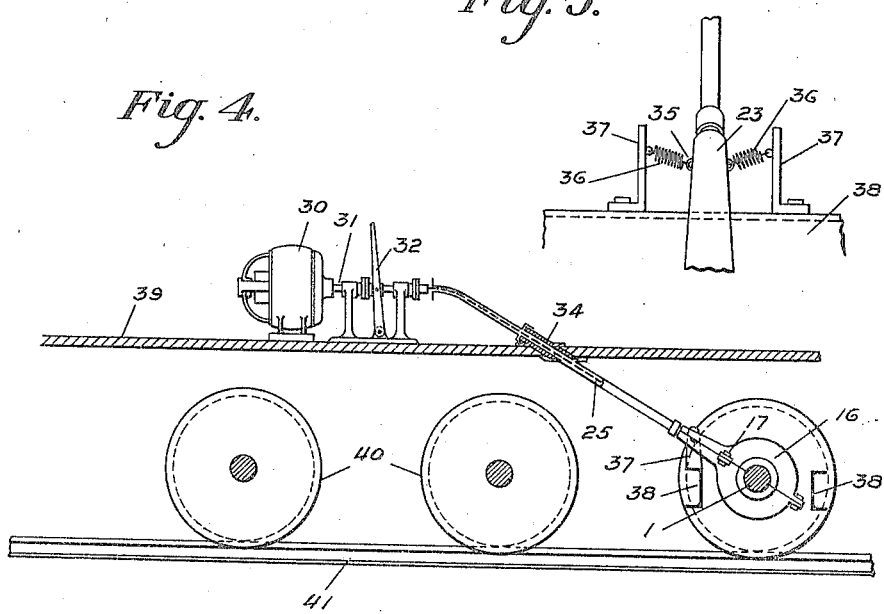
Fig. 4.
Fig. 5.

UNITED STATES PATENT OFFICE.

JOHN C. BURROWES, OF JACKSONVILLE, FLORIDA.

RAILWAY-CAR-LIGHTING MECHANISM.

1,263,848.

Specification of Letters Patent. Patented Apr. 23, 1918.

Application filed April 11, 1916. Serial No. 90,333.

*To all whom it may concern:*

Be it known that I, JOHN C. BURROWES, a citizen of the United States, and a resident of Jacksonville, in the county of Duval and State of Florida, have invented new and useful Improvements in Railway-Car-Lighting Mechanism, of which the following is a specification.

The invention relates to means or devices for lighting railway cars, and more especially to means or devices for driving a generator within the car by mechanism carried by and driven from a car axle.

Objects of the invention are to provide protection for both drive and generator from the dirt and dust raised by the trucks and running gear, and in connection therewith to support the driving mechanism from or by the car axle; to provide in such a device easy, rapid and universal interchangeability from one car axle to another without disturbing the motor; to provide in a drive of this kind complete protection from dirt and at the same time providing easy and ready access to the driving mechanism. These and other objects and advantages of the invention will be set forth in part hereinafter, and in part will be obvious herefrom, and are realized through the instrumentalities and combinations pointed out in the appended claims.

The invention consists in the novel parts, constructions, arrangements, combinations and improvements herein shown and described.

The accompanying drawings herein referred to, and constituting a part hereof, illustrate one embodiment of the invention, and together with the description serve to explain the principles thereof.

Of the drawings:—

Figure 1 is a detail of the drive with one-half of the casing removed;

Fig. 2 is a section and elevation on line A—B of Fig. 1, looking to the left, but showing the entire housing;

Fig. 3 is an elevation, largely diagrammatic, showing the drive and connections to a vertically mounted generator within the car;

Fig. 4 is a similar view to Fig. 3 but showing the generator mounted horizontally; and Fig. 5 is a fragmentary detail of the resilient support for the end of the housing which carries the flexible shaft.

Referring by way of example to the accompanying drawings, 1 represents a car axle, which may be of the usual construction employed by Pullman cars, other railway passenger cars, and like vehicles. Mounted on the axle 1 is a longitudinally halved or divided bushing or sleeve 2, the two semi-cylindrical halves of the sleeve or bushing being held from lineal relative displacement by dowel pins 3, and being held together about the axle 1 by bolts 4, the bolts passing through lugs 9 formed on the two halves of the bushing.

The bushing 2 is held in position upon the axle, both longitudinally and angularly by suitable means, the embodied form thereof comprising keys or wedges 5 fitting in longitudinally arranged ways in the inner surface of the sleeve 2, the sleeve preferably having a clearance about the axle. The wedges 5 are shown four in number at each end of the sleeve, and are preferably provided with means for driving or moving them inwardly to fix the sleeve to the axle to rotate therewith. In the embodied form of such means, screw-threaded pins 6 are fixed to and project outwardly from the two ends of the split sleeve 2. The respective keys or wedges 5 have outwardly projecting lugs or ears 7, provided with apertures through which the screw threaded pins 6 project. Nuts 8 are screwed onto the respective rods 6 to drive home the wedges 5 and to hold them securely in position. A locking nut may obviously be employed upon each of the threaded rods 6 if desired. The sleeve is thus held permanently and exactly in position both along the axle and for rotation therewith, and the two halves of the sleeve are held in exact alinement the one with the other.

The means for communicating driving motion from the axle to the generator, comprises a split beveled gear 10, the two halves of the hub 11 thereof being held together by bolts 12. The split gear 10 is connected to the sleeve 2 to turn therewith by suitable means, as by a key 13, between the interior of the hub and the bushing 2, the exterior surface of the bushing having been turned true.

A housing 16, which is likewise in two parts, that is halved or split, is mounted upon the sleeve 2 to inclose the gear 10 and the pinion driven thereby. The housing is journaled upon the bushing 2 to fit snugly thereabout, the housing bearings being between the hub 11 of the bushing, and the lugs 9 formed upon the bushing through which the fastening bolts 4 pass. The two halves of the housing are fastened together by bolts 17. Within the housing is provided a journal bearing 18 for a shaft 19. Fixed upon the inner end of the shaft 19 is a beveled pinion 20, meshing with the beveled gear 10. A collar 21 is fastened on shaft 19 at the end of the bearing 18 and in the recess 22 within the housing. The gear and pinion are thus maintained in proper position and in mesh with each other, and are inclosed and protected from the dirt and dust.

The housing as embodied is continued in a neck 23, which is closed in a suitable manner, as by recessed screw cap 24, making a substantially dirt proof joint inclosure. The connections to the generator located within the car comprise a flexible shaft 25 connected to the shaft 19 and rotating therewith, the shaft 25 being protected and provided with a bearing within the screw cap 24 by a suitable hollow sleeve 26.

A generator 30 is shown within the car, its shaft 31 connecting directly, or by suitable gearing, with the flexible shaft 25. A clutch 32 may be provided for throwing off the drive in case it is desired to stop the generator for any purpose. In Fig. 4 of the drawings, a generator is shown with its shaft 31 arranged horizontally. In either case, a suitable bearing for the shaft 25 is preferably provided in the bottom of the car, and the bearing may be arranged perpendicularly as shown at 33 in Fig. 3 or it may be arranged diagonally as shown at 34 in Fig. 4.

To provide an angularly resilient mounting for the housing and shaft, the extension 23 of the housing is provided as embodied with lugs 35, which are engaged by springs 36, which springs are supported by brackets 37 carried upon the truck structure 38 or in other suitable position. In Figs. 3 and 4, the car floor is 39 and the car wheels 40 and the rails 41, these parts being practically diagrammatically indicated.

The construction and arrangement is such that the drive is not disturbed by the abrupt and constantly recurring shifting and changing of position between the car body and the trucks, both in a vertical direction and horizontally in the transverse direction as well as longitudinally. The driving means may quickly and easily be shifted from one axle to another, and can be applied to any standard axle and minimizes the change necessary when the trucks are replaced and requires no remounting or adjustment of the generator or its bearings whatsoever. The gearing from the axle is completely inclosed and protected from the violent and destructive action of the flying stones and dirt, and at the same time access may be readily had thereto for inspection or repair. The drive has easy and free motion with the axle, while the housing has a free angular motion which absorbs the recurring abrupt changes in position, while this motion is resiliently restricted within narrow limits by the spring support for the housing.

Other advantages of the invention will be obvious herefrom to those skilled in the art, and it will be understood that changes may be made from the precise construction shown and described, without departing from the principles of the invention and without sacrificing its chief advantages.

What I claim as my invention and desire to secure by Letters Patent is:—

1. In a railway car lighting mechanism and in combination, a split sleeve surrounding a car axle with clearance therebetween, adjustable connections between the sleeve and axle for adjusting the sleeve in central position both longitudinally and angularly with respect to the axle, a gear wheel fixed to and rotating with the sleeve, a dirt excluding housing fitted about the sleeve and inclosing the gear wheel, a gear wheel also within the housing and driven by the first-mentioned gear wheel, a generator within the car, and a flexible shaft from the driven gear wheel to the generator.

2. In a railway car lighting mechanism and in combination, a split sleeve of greater bore than the axle mounted on a car wheel axle, means engaging the axle and the inside of the sleeve for holding the sleeve in selected fixed position both longitudinally and angularly with respect to the axle, a gear wheel fixed to and rotating with the sleeve, a dirt excluding housing fitted about the sleeve and inclosing the gear wheel, a driven gear wheel within the housing and having a bearing which is maintained concentric with the first-mentioned gear wheel, and a flexible shaft from said driven gear to a generator.

3. In a railway car lighting mechanism and in combination, a split sleeve about a car axle and of greater bore than the axle to provide clearance therebetween, screw-threaded connections between the sleeve and axle to center and fix in position the sleeve on the axle by means of the clearance therebetween, a driving gear on the sleeve, a dirt excluding housing surrounding the gear, a driven gear journaled in the housing and meshing with the driving gear, a motor and flexible driving connection from the driven gear to the motor.

4. In a railway car lighting mechanism and in combination, a split sleeve about a car axle and of greater bore than the axle to provide clearance therebetween, adjustable connections between the sleeve and axle to center and fix in position the sleeve on the axle by means of the clearance therebetween, a driving gear on the sleeve, a dirt excluding housing surrounding the gear, a driven gear journaled in the housing and meshing with the driving gear, a motor and flexible driving connection from the driven gear to the motor.

In testimony whereof, I have signed my name to this specification, in the presence of two subscribing witnesses.

JOHN C. BURROWES.

Witnesses:
J. N. MOORE,
F. C. SAWYER.